June 2, 1964  M. HAYMAN ETAL  3,135,530
BUMPER ATTACHMENT FOR BALL COUPLING HITCH
Filed April 9, 1962  2 Sheets-Sheet 1
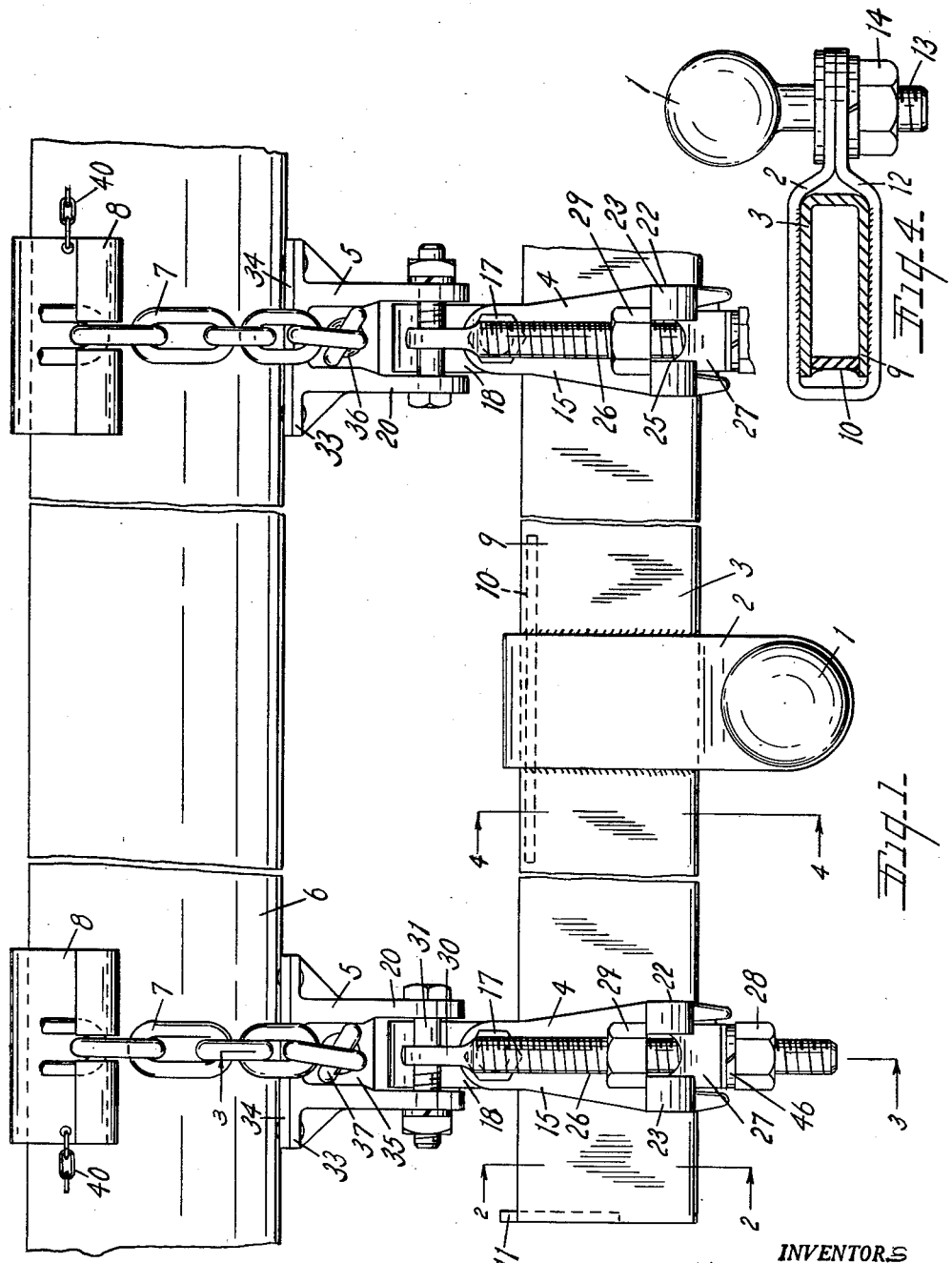
INVENTORS
Max Hayman
Ernest G. Hellenga
BY
ATTORNEY June 2, 1964  M. HAYMAN ETAL  3,135,530
BUMPER ATTACHMENT FOR BALL COUPLING HITCH
Filed April 9, 1962  2 Sheets-Sheet 2
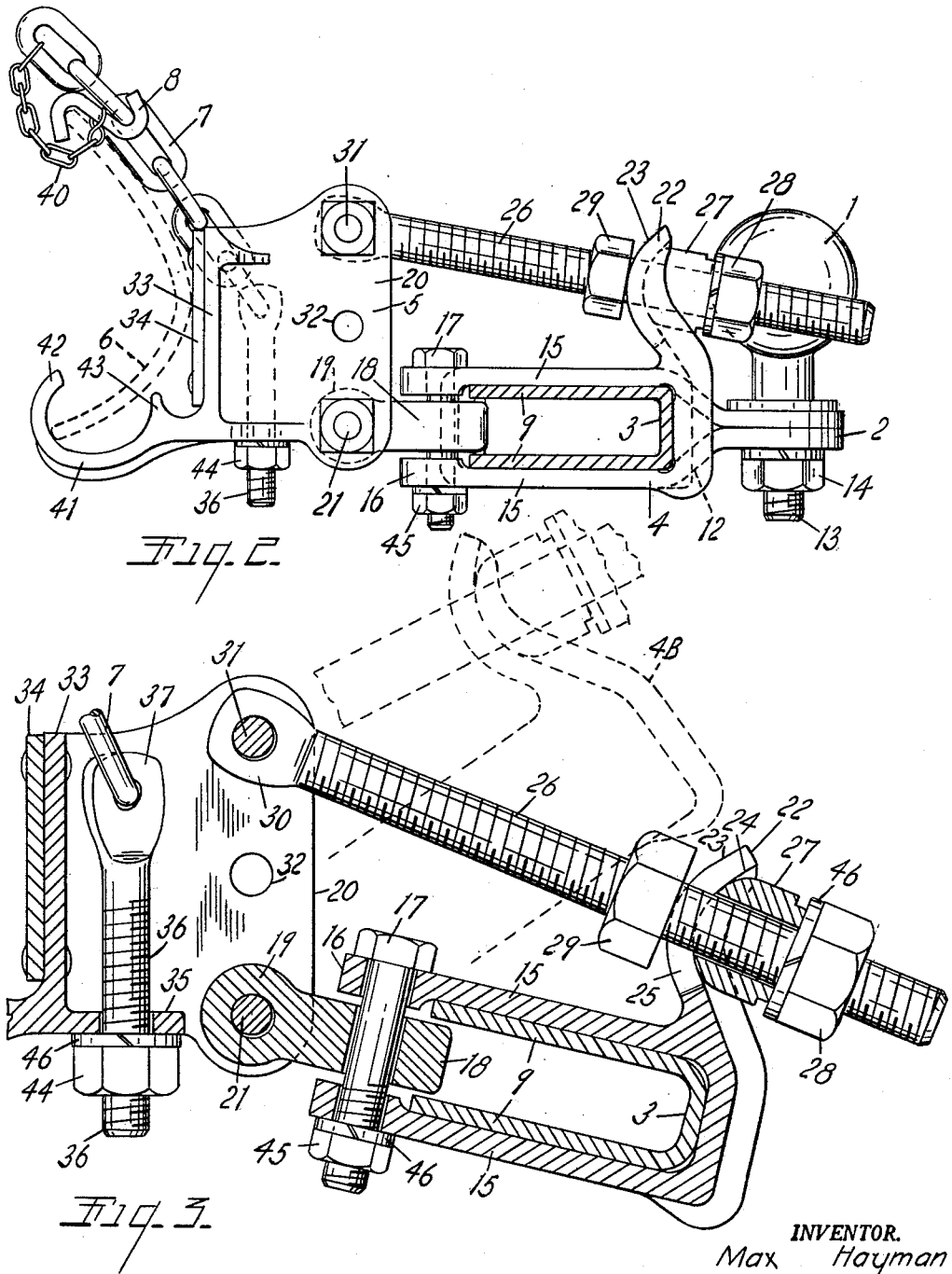
INVENTOR.
Max Hayman
Ernest G. Hellenga
BY
ATTORNEY

United States Patent Office 3,135,530
Patented June 2, 1964

3,135,530
BUMPER ATTACHMENT FOR BALL
COUPLING HITCH
Max Hayman, Battle Creek, and Ernest G. Hellenga,
Three Oaks, Mich., assignors to Pilot Distributing
Company, Battle Creek, Mich.
Filed Apr. 9, 1962, Ser. No. 185,919
7 Claims. (Cl. 280—490)

This invention relates to improvements in bumper attachment for ball coupling hitch. The principal objects of this invention are:

First, to provide a readily attachable and detachable coupling for attaching a ball hitch element to a vehicle bumper for further connecting a trailer to the vehicle.

Second, to provide a coupling attachment which is adaptable to bumpers of various shapes and contours and adjustable to position a ball hitch element carried by the attachment at various levels in a generally upright position for proper connection to a trailer coupling.

Third, to provide a bumper attachment for connecting a ball hitch element to the bumper in which the connections between the attachment and the bumper and the adjustment of the attachment to locate the ball hitch element are all readily adjustable by means of readily accessible threaded bolts so that the attachment can be installed and adjusted with a single open end wrench.

Fourth, to provide a hitch attachment which is adjustable for attachment to a bumper at selectively spaced points and in which the several parts are all interconnected so as to prevent loss of essential parts.

Other objects and advantages of the invention will be apparent from a consideration of the following description and claims. The drawings, of which there are two sheets, illustrate a highly practical form of the bumper attachment.

FIG. 1 is a fragmentary top plan view of the ball hitch attachment attached to the rear bumper of a towing vehicle.

FIG. 2 is a fragmentary longitudinal vertical cross sectional view taken along the plane of the line 2—2 in FIG. 1 illustrating one of the coupling connections of the attachment in side elevation.

FIG. 3 is a fragmentary enlarged vertical longitudinal cross sectional view taken along the plane of the line 3—3 in FIG. 1 and illustrating the adjusting elements of the coupling of the attachment.

FIG. 4 is a vertical longitudinal cross sectional view taken along the plane of the line 4—4 in FIG. 1.

The towing attachment consists generally of a ball hitch element 1 of the type commonly used to connect trailers to automobiles. The ball element 1 is carried by a yoke 2 fixedly secured to the center of a draft bar 3. A pair of connecting yokes 4 slidably adjustable on each end of the draft bar are adjustably connected to coupling heads 5 which are in turn clamped to the bumper 6 of the towing vehicle by chains 7 and hooks 8 as will be more particularly described.

The draft bar 3 is of folded channel shaped metal with its flanges 9 opening forwardly and spaced apart and reinforced by a center filler plate 10 and end filler plates 11 welded between the flanges of the channel. The arms 12 of the yoke 2 are welded to the draft bar and brought together on the rear side thereof to receive the shank 13 and connecting nut 14 of the ball coupling element.

As appears more clearly from FIGS. 2 and 3 the connecting yokes 4 have forwardly projecting arms 15 with thickened tips 16 which embrace the flanges of the draft bar 3. Clamp bolts 17 passes through the thickened tips 16 clamp the connecting yokes to the draft bar in the desired position to most effectively connect the attachment to the bumper 6. The forwardly projecting ends of the filler plates 11 prevent accidental sliding of the connecting yokes off of the ends of the draft bar until the clamp bolts 17 have been purposely removed.

The shanks of the clamp bolts 17 freely pivotally engage the rearwardly projecting ends of draw blocks 18 which project forwardly to horizontally drilled cross pieces 19 integral with the draw blocks. The cross pieces fit closely between spaced rearwardly projecting side plates 20 on the coupling heads and are pivotally secured in place by lower cross bolts 21. The cross bolts 21 act as pivots for the draw blocks and are not normally adjusted once the attachment has been assembled.

The rear ends of the connecting yokes 4 have upwardly extending curved ears 22 with forwardly convex surfaces 23 and rearwardly concave surfaces 24 with a slot 25 therebetween. The slot passes a connecting bolt 26 having a threaded rear end that projects through a thrust block 27. The thrust block has a convex face seating against the concave surfaces 24 of the ears 22 and an adjustable clamp nut 28 secures the thrust block on the draw bolt. A lock nut 29 clamps the thrust block and ears in adjusted position. The forward ends of the draw bolts have eyes 30 pivotally engaged over upper bolts 31 engaged through upper holes in the side plates 20 of the coupling heads. The bolts 31 constitute upper pivots for raising and lowering the connecting yokes as the adjusting nuts 29 and 28 are adjusted. FIG. 3 illustrates an upwardly tilted adjustment of the connecting yokes in dotted lines at 4B. In order to obtain a wider range of adjustment of the connecting yokes and the draft bar, the rearwardly projecting plates 20 on the coupling heads may be provided with an intermediate pair of pivot holes 32 as alternate locations for the pivot bolts 21 and the draw blocks 18.

The coupling head 5 includes the previously mentioned rearwardly projecting plates 20 and a transverse upright plate 33 having a bumper engaging pad 34 secured to its forward face. A bottom wall 35 connects the side plates 20 along their lower edges and defines a vertical hole for passing the clamp bolt 36. The upper end of the clamp bolt 36 has an eye 37 engaged by one end of a chain 7. The other end of the chain 7 is selectively engaged with an S-hook 8 which engages over the upper edge of the bumper 6. To prevent loss of the S-hooks 8 they are flexibly connected to the end link of the chain 7 by a short light chain 40. The lower edge of the body plate 5 of the coupling head has an integral forwardly projecting flange 41 with a forward hook 42 and an upright hook rib 43 thereon. The hooks 42 and 43 are adapted to engage the lower edge of various shaped bumpers. A clamp nut 44 on the clamp bolt 36 draws the chain 38 tight to securely clamp the coupling head to the rear face of the bumper.

Since automobile bumpers vary considerably in shape and contour between various makes and models, the coupling head 5 may assume various angular positions and elevations relative to the bumper and the angular position of the draft bar and ball hitch element relative to the coupling heads may be adjusted by adjusting the nuts 28 and 29 to position the ball hitch element at the desired elevation and angle for the particular trailer to be connected to the particular bumper. The clamp nuts 28, 29 on the draw bolt and the clamp nuts 45 on the bolts 17 and the nuts 44 on the clamp bolts 36 are desirably all of the same size so as to be readily adjustable by a single open end wrench for easy attachment and adjustment of the bumper attachment and the position of the ball hitch element. Lock washer 46 are provided behind the several nuts as necessary to assure that the clamping and adjusting nuts stay in their tightened position.

What is claimed as new is:

1. A bumper attachment for a ball coupling hitch comprising,
   a draft bar of forwardly facing channel section having filler plates between its flanges at the center and ends of the bar,
   a towing yoke fixedly secured around the center of said bar and having a ball hitch element secured to its rear end,
   a pair of connecting yokes slidably mounted on said bar and having arms projecting forwardly thereof,
   spaced upstanding ears on the rear ends of said connecting yokes and having forwardly convex and rearwardly concave surfaces,
   thrust blocks seated against the concave surfaces,
   draw bolts passed through said thrust blocks and extending adjustably between the spaced ears on said connecting yokes,
   draw blocks positioned between the arms of said connecting yokes on the forward side of said draft bar,
   upright bolts swivelly connecting said draw blocks to said connecting yokes and releasably clamping the arms of the connecting yokes to said draft bar,
   a pair of coupling heads releasably attachable to a bumper and having rearwardly projecting upright plates having upper, lower and intermediate pairs of holes formed therethrough,
   transverse bolts passed through said upper pairs of holes and connecting the forward ends of said draw bolts to said coupling heads,
   and other transverse bolts passed selectively through lower pairs of holes and said draw blocks.

2. A bumper attachment for a ball coupling hitch comprising,
   a draft bar of forwardly facing channel section,
   a towing member fixedly secured to the center of said bar and having a ball hitch element secured thereto,
   a pair of connecting yokes slidably mounted on said bar and having arms projecting forwardly thereof,
   spaced upstanding ears on the rear ends of said connecting yokes and having forwardly convex and rearwardly concave surfaces,
   thrust blocks seated against said concave surfaces,
   thrust bolts passed through said thrust blocks and extending adjustably between the spaced ears on said connecting yokes,
   draw blocks positioned between the arms of said connecting yokes on the forward side of said draft bar,
   upright bolts swivelly connecting said draw blocks to said connecting yokes and releasably clamping the arms of the connecting yokes to said draft bar,
   a pair of coupling heads releasably attachable to a bumper and having rearwardly projecting upright plates having upper and lower pairs of holes formed therethrough,
   transverse bolts passed through said upper pairs of holes and connecting the forward ends of said draw bolts to said coupling heads,
   and other transverse bolts passed through said lower pair of holes and said draw blocks.

3. A bumper attachment for a ball coupling hitch comprising,
   a draft bar of forwardly facing channel section having filler plates between its flanges at the center and ends of the bar,
   a ball hitch element fixedly secured to the center of said bar,
   a pair of connecting yokes slidably mounted on said bar and having arms projecting forwardly thereof,
   spaced upstanding ears on the rear ends of said connecting yokes and having forwardly convex and rearwardly concave surfaces,
   thrust blocks seated against the concave surfaces,
   draw bolts passed through said thrust blocks and extending adjustably between the spaced ears on said connecting yokes,
   draw blocks positioned between the arms of said connecting yokes on the forward side of said draft bar,
   upright bolts swivelly connecting said draw blocks to said connecting yokes,
   a pair of coupling heads releasably attachable to a bumper and having rearwardly projecting upright plates having upper, lower and intermediate pairs of holes formed therethrough,
   transverse bolts passed through said upper pairs of holes and connecting the forward ends of said draw bolts to said coupling heads,
   and other transverse bolts passed selectively through lower pairs of holes and said draw blocks.

4. A bumper attachment for a ball coupling hitch comprising,
   a draft bar,
   a ball hitch element fixedly secured to the center of said bar,
   a pair of connecting yokes slidably mounted on said bar and having arms projecting forwardly thereof,
   spaced upstanding ears on the rear ends of said connecting yokes and having forwardly convex and rearwardly concave surfaces,
   thrust blocks seated against said concave surfaces,
   thrust bolts passed through said thrust blocks and extending adjustably between the spaced ears on said connecting yokes,
   draw blocks positioned between the arms of said connecting yokes on the forward side of said draft bar,
   upright bolts swivelly connecting said draw blocks to said connecting yokes and releasably clamping the arms of the connecting yokes to said draft bar,
   a pair of coupling heads releasably attachable to a bumper and having rearwardly projecting upright plates having upper and lower holes formed therethrough,
   transverse pivots passed through said upper holes and connecting the forward ends of said draw bolts to said coupling heads,
   and other transverse pivots passed through said lower holes and said draw blocks.

5. A bumper attachment for a ball coupling hitch comprising,
   a coupling member releasably attachable to the rear of a bumper and having rearwardly projecting spaced upright plates with vertically spaced pairs of holes formed transversely through the plates,
   horizontal pivots passed through said pairs of holes,
   a draw block pivotally mounted on the lower one of said pivots and extending between said plates and projecting rearwardly therefrom,
   a draw bolt having an eye pivotally mounted on the upper one of said pivots,
   a connecting yoke member having forwardly projecting arms pivotally connected to the rearwardly projecting end of said draw block,
   spaced curved ears projecting vertically upwardly from said connecting member and having forwardly convex and rearwardly concave surfaces,
   a thrust block having a convex surface seated against said concave surfaces and defining a hole receiving said draw bolt with the bolt passed between said ears,
   clamp nuts threaded on said draw bolt on opposite sides of said thrust block and said ears,
   a draft bar clamped between said arms on said connecting yoke member,
   and a ball hitch element mounted on said draft bar and connected to said draw block through said draft bar and said yoke member.

6. A bumper attachment for a ball coupling hitch comprising,
   a coupling member releasably attachable to the rear of a bumper and having rearwardly projecting spaced upright plates with vertically spaced pairs of holes formed transversely through the plates, horizontal pivots passed through said pairs of holes, a draw block pivotally mounted on one of said pivots and extending between said plates and projecting rearwardly therefrom, a draw bolt having an eye pivotally mounted on the other of said pivots, a connecting member connected to the rearwardly projecting end of said draw block, spaced curved ears projecting vertically from said connecting member and having forwardly convex and rearwardly concave surfaces, a thrust block having a convex surface seated against said concave surfaces and defining a hole receiving said draw bolt with the bolt passed between said ears, clamp nuts threaded on said draw bolt on opposite sides of said thrust block and said ears, and a ball hitch element connected to said connecting member.

7. A bumper attachment for a ball coupling hitch comprising, a coupling member releasably attachable to the rear of a bumper and having a rearwardly projecting upright plate with vertically spaced holes formed transversely through the plate, horizontal pivots passed through said holes, a draw block pivotally mounted on one of said pivots and extending rearwardly therefrom, a draw bolt having an eye pivotally mounted on the other of said pivots, a connecting member pivotally connected to the rearwardly projecting end of said draw block, a curved ear projecting vertically from said connecting member and having forwardly convex and rearwardly concave surfaces, a thrust block having a convex surface seated against said concave surface with said draw bolt passed through the thrust block, clamp nuts threaded on said draw bolt on opposite sides of said thrust block and said ear, and a ball hitch element connected to said connecting member.

References Cited in the file of this patent
UNITED STATES PATENTS

| | | |
|---|---|---|
| 1,775,297 | Towner | Sept. 9, 1930 |
| 2,347,081 | Caton | Apr. 8, 1944 |
| 2,791,445 | Wanamaker | May 7, 1957 |